US012629774B2

(12) United States Patent
Stivale et al.

(10) Patent No.: US 12,629,774 B2
(45) Date of Patent: May 19, 2026

(54) METHOD FOR MANUFACTURING A SHROUDED IMPELLER

(71) Applicant: NUOVO PIGNONE TECNOLOGIE—S.R.L., Florence (IT)

(72) Inventors: Vincenzo Stivale, Florence (IT); Stefano Ricci, Florence (IT); Stefano Costantino, Florence (IT); Massimo Guerrini, Florence (IT)

(73) Assignee: Nuovo Pignone Tecnologie—S.r.l., Florence (IT)

( * ) Notice: Subject to any disclaimer, the term of this patent is extended or adjusted under 35 U.S.C. 154(b) by 0 days.

(21) Appl. No.: 18/998,594

(22) PCT Filed: Jul. 28, 2023

(86) PCT No.: PCT/EP2023/025359
§ 371 (c)(1),
(2) Date: Jan. 27, 2025

(87) PCT Pub. No.: WO2024/022619
PCT Pub. Date: Feb. 1, 2024

(65) Prior Publication Data
US 2025/0332663 A1      Oct. 30, 2025

(30) Foreign Application Priority Data

Jul. 29, 2022     (IT) ......................... 102022000016164

(51) Int. Cl.
*B23K 26/21*          (2014.01)
*B23K 26/08*          (2014.01)
*F04D 29/28*          (2006.01)

(52) U.S. Cl.
CPC .............. *B23K 26/21* (2015.10); *B23K 26/08* (2013.01); *F04D 29/28* (2013.01)

(58) Field of Classification Search
CPC ...... B23K 26/21; B23K 26/08; B23K 26/082; B23K 26/24; B23K 26/342;
(Continued)

(56) References Cited

U.S. PATENT DOCUMENTS 4,232,657 A * 11/1980 Killorin ................ F24D 11/005
                                                              126/609
8,162,614 B2 * 4/2012 Jahnen ....................... F01D 5/34
                                                              219/121.64
(Continued)

FOREIGN PATENT DOCUMENTS

CN         113829004 A  * 12/2021  ............. F04D 29/30
JP        2008240584 A    10/2008
(Continued)

*Primary Examiner* — Bayan Salone
(74) *Attorney, Agent, or Firm* — Paul Frank + Collins P.C.

(57) ABSTRACT

The method comprises a preliminary step of placing a disk and a shroud coaxial to one another, wherein one of said disk and said shroud comprises a plurality of blades projecting towards the other of said disk and said shroud, each blade having a base and a tip; wherein the other of said disk and said shroud comprises a plurality of grooves in an outer surface thereof facing opposite the blades; wherein each groove has side surfaces and a bottom; and wherein the shroud and the disk are placed in contact with one another along the blades, with each groove of said plurality of grooves extending along the respective one of said plurality of blades. Next, each blade is welded to the other of said disk and said shroud along the respective groove by a wobbling laser beam applied from the exterior of the impeller and moved along the groove.

18 Claims, 7 Drawing Sheets

(58) Field of Classification Search
CPC . B23K 2101/001; F04D 29/28; F04D 29/023; F04D 29/284; F04D 29/624; F05D 2230/234
See application file for complete search history.

(56) References Cited

U.S. PATENT DOCUMENTS

| | | | | |
|---|---|---|---|---|
| 8,408,873 | B2 * | 4/2013 | Iwasa | B23K 26/206 |
| | | | | 29/889.7 |
| 2008/0237195 | A1 * | 10/2008 | Iwasa | B23K 33/00 |
| | | | | 415/173.1 |
| 2009/0095719 | A1 * | 4/2009 | Tsukamoto | B23K 26/28 |
| | | | | 219/121.64 |
| 2009/0252606 | A1 * | 10/2009 | Jahnen | F04D 29/284 |
| | | | | 219/121.64 |
| 2015/0266130 | A1 * | 9/2015 | Fomin | B23K 26/22 |
| | | | | 219/121.62 |
| 2018/0326536 | A1 * | 11/2018 | Mentzel | B22F 10/38 |
| 2020/0376594 | A1 * | 12/2020 | Grapov | B23K 26/0676 |

FOREIGN PATENT DOCUMENTS

| | | | | | |
|---|---|---|---|---|---|
| JP | 2009090349 | A | * | 4/2009 | F04D 29/284 |
| JP | 2010053797 | A | * | 3/2010 | |
| JP | 2010094701 | A | * | 4/2010 | |
| JP | 5735672 | B1 | * | 6/2015 | G06Q 10/40 |
| JP | 2016059959 | A | * | 4/2016 | |
| JP | 2018061983 | A | * | 4/2018 | |
| JP | 2018520007 | A | * | 7/2018 | B23K 26/21 |
| JP | 2020184516 | A | * | 11/2020 | |
| JP | 2021053659 | A | * | 4/2021 | |
| JP | 2021536366 | A | * | 12/2021 | B23K 26/1464 |
| JP | 6998630 | B1 | | 1/2022 | |
| JP | 2022001374 | A | * | 1/2022 | B23K 26/064 |
| WO | WO-2020008772 | A1 | * | 1/2020 | B23K 26/244 |
| WO | WO-2021138510 | A1 | * | 7/2021 | B23K 26/21 |

* cited by examiner

METHOD FOR MANUFACTURING A SHROUDED IMPELLER

TECHNICAL FIELD

The present disclosure concerns the field of turbomachinery. Embodiments disclosed herein specifically concern methods for manufacturing shrouded impellers for turbomachines.

BACKGROUND ART

Several kinds of turbomachines use rotating impellers for converting mechanical power into pressure power of a gaseous stream or vice-versa. Specifically, turboexpanders comprise impellers mounted on a shaft for expanding a compressed gaseous stream and converting energy of the compressed fluid into mechanical power made available on the rotating shaft of the expander. Centrifugal compressors and centrifugal pumps comprise rotating impellers to compress a gaseous stream using mechanical power applied to the rotary shaft of the compressor.

In general, an impeller includes a disk, also known as hub, having a plurality of blades integral therewith. The blades may have a so-called three-dimensional shape or twist. Some impellers, to which the present disclosure specifically refers, further include a shroud. The disk, the shroud and the blades arranged therebetween define flow channels, wherein the gaseous stream flows and exchanges energy with the rotating impeller. Usually, the blades are formed by machining a blank, and forming the disk and the blades as a single monolithic body. The shroud is then welded on the tips of the blades, usually by arc-welding (U.S. Pat. No. 42,302,657). Attempts to use laser welding have also been made in the past (U.S. Pat. No. 8,408,873), aimed at reducing thermal distortions and stresses induced in the impeller by traditional arc-welding technology.

Laser welding has proven to have severe limitations, especially in terms of maximum dimension of shrouded impellers which can be manufactured with such technology.

Therefore, a need still exists for improvements in the field of laser welding of shrouded impellers.

SUMMARY

According to the present disclosure, a method for manufacturing a shrouded impeller is provided, including a preliminary step of placing a disk and a shroud coaxial to one another. One of said disk and said shroud comprises a plurality of blades projecting towards the other of said disk and said shroud, each blade having a base and a tip. The other of said disk and said shroud comprises a plurality of grooves in an outer surface thereof facing opposite the blades; wherein each groove has side surfaces and a bottom. The shroud and the disk are placed in contact with one another along the blades, with each groove of said plurality of grooves extending along the respective one of said plurality of blades. The method further comprises the step of welding each blade to the other of said disk and said shroud along the respective groove by a wobbling laser beam, i.e., using a laser beam having a wobbling motion, applied from the exterior of the impeller and moved along the groove.

In some embodiments, the step of welding each blade to the other of said disk and said shroud along the respective groove can comprise the following steps:

passing at least once the laser beam with a wobbling movement along each groove and causing melting of the bottom of the groove and subsequent solidification of the molten bottom to weld the disk and the shroud along the groove;

filling the groove with a metal filling material by generating a sequence of superimposed layers of metal material, each layer being molten with the laser beam with a wobbling movement and subsequently solidified.

In particularly preferred embodiments, a preliminary peripheral welding can be performed, once the disk and the shroud have been placed coaxial to one another, in order to provisionally connect the shroud and the disk to one another in the correct mutual angular position. Next, each blade provided on one of said shroud and said disk is welded to the other of said disk and said shroud along the respective groove by performing the following steps:

a) passing a laser beam with a wobbling movement along a first trajectory extending along the groove and causing local welding of the disk and the shroud along the first trajectory;

b) if required by the width of the groove, passing the laser beam with a wobbling movement along a further trajectory, parallel to the first trajectory and laterally offset therefrom in a direction of a width of the groove;

c) if needed, repeating step (b) until the whole bottom of the groove is welded to the respective blade;

d) forming a layer of metal filling material in the groove by:

d1. passing the laser beam with a wobbling movement along a first filling trajectory extending along the groove while delivering a metal filling material in the groove and melting the metal filling material with the laser beam;

d2. if required by the width of the groove, passing the laser beam with a wobbling movement along a further filling trajectory, parallel to the first filling trajectory and laterally offset therefrom in the direction of the width of the groove;

d3. If needed, repeating step (d2) until the whole width of the groove is filled with a layer of molten and solidified metal filling material;

e) repeating step (d) for subsequent layers of metal filling material until a height of the groove is filled with a plurality of layers of molten and solidified metal filling material.

Once steps (a), (b) and (c) for one blade have been completed, step (d) can be performed. Preferably, however, a next blade is welded along the respective groove by performing steps (a), (b) and (c). Preferably, steps (a), (b) and (c) are performed for all blades and only afterwards steps (d) and (e) are performed, starting with one of the blades. Similarly, steps (d) and (e), required to fill the groove with metal filling material, can be performed for one blade at a time. Preferably, however, step (d) is performed once for each blade and then repeated in sequence for the different blades, such that all grooves are gradually filled with subsequent layers of metal filling material.

In general, the shroud and the disk which are welded to one another with the steps outlined above can be semi-finished, i.e., may require additional machining and possible hardening or finishing steps, to achieve the shape and structure of the final impeller. As will become apparent from the detailed description of an embodiment, the shroud and the disk can have a much larger thickness and diameter than the final disk and shroud, once the impeller has achieved its final shape. Large machining allowance both on the shroud and on the disk is useful to reduce the thermal deformations during welding. The additional metal material will be removed by machining to obtain the final shape of the impeller, in one or more steps, possibly in combination with thermal treatments aimed at modifying the mechanical properties of the impeller, e.g. for hardening purposes, and/or to reduce internal stresses or for other reasons.

Further features and embodiments of the method of the present disclosure are described in greater detail here below, reference being made to the attached drawings, and are set forth in the appended claims.

BRIEF DESCRIPTION OF THE DRAWINGS

Reference is now made briefly to the accompanying drawings, in which.

DETAILED DESCRIPTION

The following description refer specifically to a shrouded impeller for a centrifugal compressor. However, the method disclosed herein can be used also for manufacturing impellers for pumps or for turboexpanders.

In short, the method provides for welding the blades to the shroud (or to the disk) of an impeller, by providing a plurality of grooves in the shroud (or in the disk), each groove being substantially co-extensive with a respective blade. Each blade is then welded to the shroud (or to the disk) of the impeller from the exterior of the impeller, by melting the bottom of the respective groove and subsequently solidifying the molten material using a wobbling laser, which performs one or more passes along the groove. Once the bottom of the groove has been molten and solidified, thus forming a first layer of welded material, the groove is filled with additional metal material, which is delivered (e.g., in powder or wire form) into the groove and molten with a plurality of passes of the laser beam. The wobbling movement of the laser beam generates a pool of molten metal which is larger than the laser spot. This enables quick filling of the groove with molten and subsequently solidified metal material, by generating superposed layers of molten and subsequently solidified metal material. Each layer is in turn formed by at least one strip, preferably by a plurality of strips of molten and solidified metal material arranged side-by-side. Each strip is formed by passing the wobbling laser along a trajectory which follows the longitudinal extension of the groove.

Figures 1, 2:
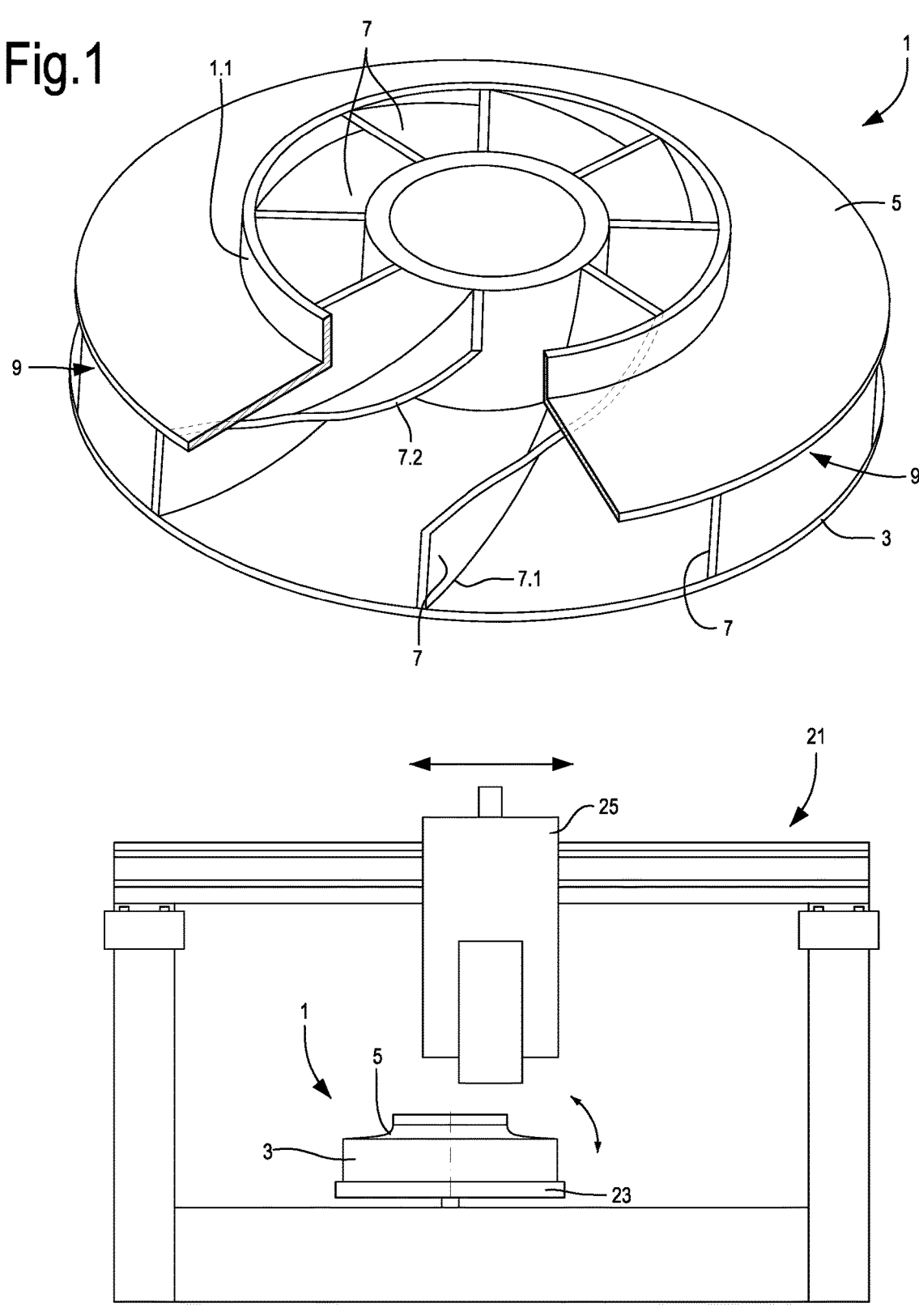
FIG. 1 illustrates a schematic machining device comprising a base and a laser head.
FIG. 2 illustrates a laser welding apparatus in one embodiment.

Turning now to the drawings, FIG. 1 illustrates an impeller in an axonometric view. The impeller 1 includes a disk, or hub 3 and a shroud 5. A plurality of blades 7 is arranged between the disk 3 and the shroud 5. The blades 7 can be three-dimensional blades. Each blade includes a base 7.1 connected to the disk and a tip 7.2 connected to the shroud.

In some embodiments the disk 3 and the blades 7 can be machined by milling from a single blank, while the shroud is manufactured separately and subsequently connected by laser welding to the blade tips, thus forming the final shrouded impeller 1. Specifically, the disk 3 has an inner surface 3.1 (see also FIG. 10), where to the bases 7.1 of the blades 7 are connected and wherefrom the blades 7 project towards the shroud 5. The opposite, external surface of the disk 3 is labeled 3.2. The shroud 5 has an inner surface 5.1 facing the interior of the impeller 1, connected to the tips 7.2 of the blades 7. The opposite, outer surface of the shroud 5 is labeled 5.2. Flow channels 9 are formed between the inner surface 3.1 of the disk 3 and the inner surface 5.1 of the shroud 5 and between adjacent blades 7.

In other embodiments, the blades and the shroud can be manufactured by machining, e.g., milling, a blank, and a disk can be manufactured separately and welded to the blade bases subsequently to form the shrouded impeller.

In presently preferred embodiments, the shroud 5 is manufactured separately and welded to the tips 7.2 of the blades 7 machined with the disk 5 from a single blank.

When the shroud 5 is welded to tips 7.2 of the blades 7 extending from the inner surface 5.1 of the disk 5, the outer surface 5.2 of the shroud 5 is machined to provide a plurality of grooves 11 therein. Each groove has a bottom 11.1 and side surfaces 11.2 and extends longitudinally along a curve which, when the shroud 5 is welded to the blades 7, extends along the tip 7.2 of a respective blade 7.

Welding of the shroud to the blade tips 7.2 is performed using a wobbling laser as described in greater detail below. The welding process includes two-stages for each blade 7 and respective groove 11. In the first stage the metal material forming the bottom of the groove and the metal material forming the tip 7.2 of the respective blade 7 are molten by heating with laser power and subsequently solidified to form a welded connection between the shroud 5 and the disk 3. In a second stage, the groove 11 is gradually filled with metallic material, which is fed in powder or wire form and molten by laser power and subsequently solidified in the groove.

The following detailed description refers to the laser welding process summarized above, performed along a single groove. The same process is repeated for each groove until the shroud 5 is welded to the disk 3 along a number of welding lines equal to the number of blades 7. For the sake of description, here below the process is described as being performed on a single groove with the first stage and the second stage being performed sequentially along the same groove. Once both stages of the process have been performed on a first groove, the next groove and blade are processed, and so on until the shroud 5 is fully welded to all blades 7. However, it shall be understood that a first stage of bottom welding can be performed sequentially for all grooves; and the next stage of groove filling can be performed once the bottom of each groove 11 has been welded to the respective blade tip 7.2.

In some embodiments, the grooves are welded to the respective blades in a sequence adapted to reduce the risk of thermal deformations of the impeller, for instance starting with a first groove and next with a second groove angularly staggered by 180° with respect to the first groove; the third groove to be welded is staggered by 90° with respect to the second groove; the fourth groove to be welded is staggered by 180° with respect to the third, and so on. The same sequence is followed in the second stage to fill each groove.

The laser apparatus for performing the welding process is schematically shown in FIG. 2. In general, the apparatus includes a support for the impeller 1 and a laser head. The laser head and the impeller are provided with movements along numerically controlled axes, such that a laser beam generated by the laser head can scan each groove 11 of the shroud 5.

More specifically, in the embodiment schematically shown in FIG. 2 the apparatus 21 includes a tilting table 23, on which the disk 3 of the impeller 1 can be blocked. The tilting table 23 can be provided with a numerically controlled motion around one or two numerically controlled rotation axes, which are preferably oriented at 90° to one another. The apparatus 21 further includes a laser head 25, which can be provide with movements according to numerically controlled translation axes, for instance two numerically controlled translation axes, orthogonal to one another. In a different embodiment, not shown, the laser head 25 can be mounted on a robot arm, for example an anthropomorphic robot arm.

Figures 3, 4:
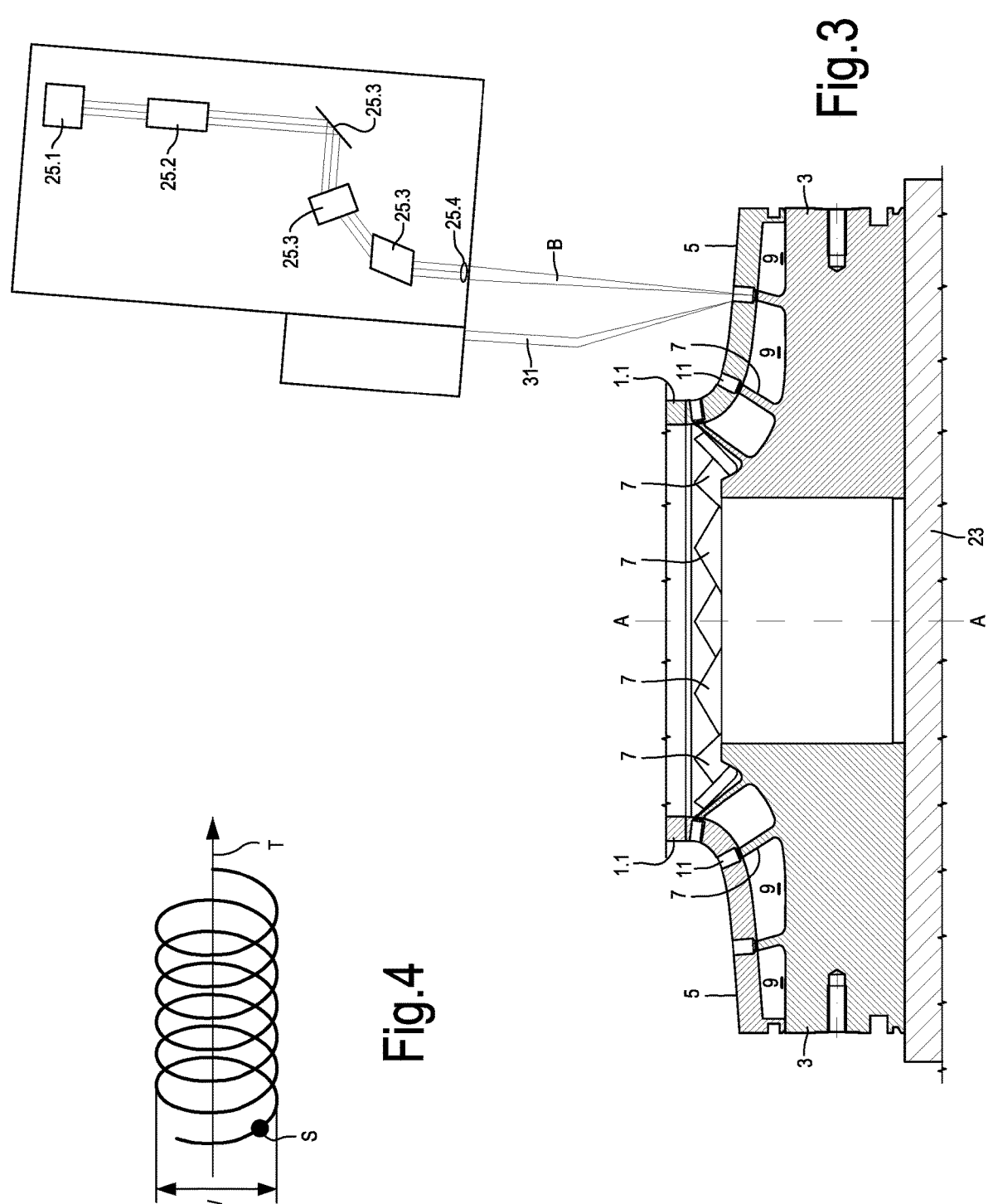
FIG. 3 illustrates a schematic of the laser head in a step of the welding process.
FIG. 4 illustrates an exemplary embodiment of a trajectory of motion of a wobbling laser spot during welding.

A schematic of the laser head 25 and of the impeller 1 during a welding step of the welding process is shown in FIG. 3. The laser head 25 comprises a wobbling laser, i.e., a laser source and relevant optics which impart a wobbling movement to the laser beam generated by the laser source. A wobbling laser source is disclosed for instance in US2020/0376594.

In some embodiments, the laser head includes a laser source 25.1, a collimator 25.2, a set of movable mirrors 25.3 and a focalizing optics 25.4. the movable mirrors 25.3 can be controlled by suitable actuators for generating a wobbling movement.

The wobbling laser source can be moved with respect to the impeller such that the laser spot generated by the laser optics 25.2-25.4 moves along a main trajectory T, for instance parallel to the groove 11, and is further provided with a wobbling motion around a center point. The center point moves along the main trajectory. The resulting trajectory of the laser spot on the metal material to be welded is a continuous line along a main direction, combined with a periodical motion. If the wobbling movement is for instance a circular movement around a center point and the main trajectory is a continuous line along which the center point moves, the laser spot will move according to a line as depicted in FIG. 4.

The wobbling movement combined with the main movement of the laser spot along the main trajectory thereof results in a pool of molten metal whose dimension is larger than the laser spot, and given by the diameter of the circular wobbling movement. In FIG. 4 reference S represents the laser spot and W is the width of the pool of molten metal.

As will become clearer from the following detailed description of the welding process, the wobbling movement of the laser spot S allows welding of large impellers, where the blades have a thickness which can be a multiple of the diameter of the laser spot S, and therefore the width of the grooves 11 is comparatively wide, with a comparatively small number of laser passes.

Figure 5:
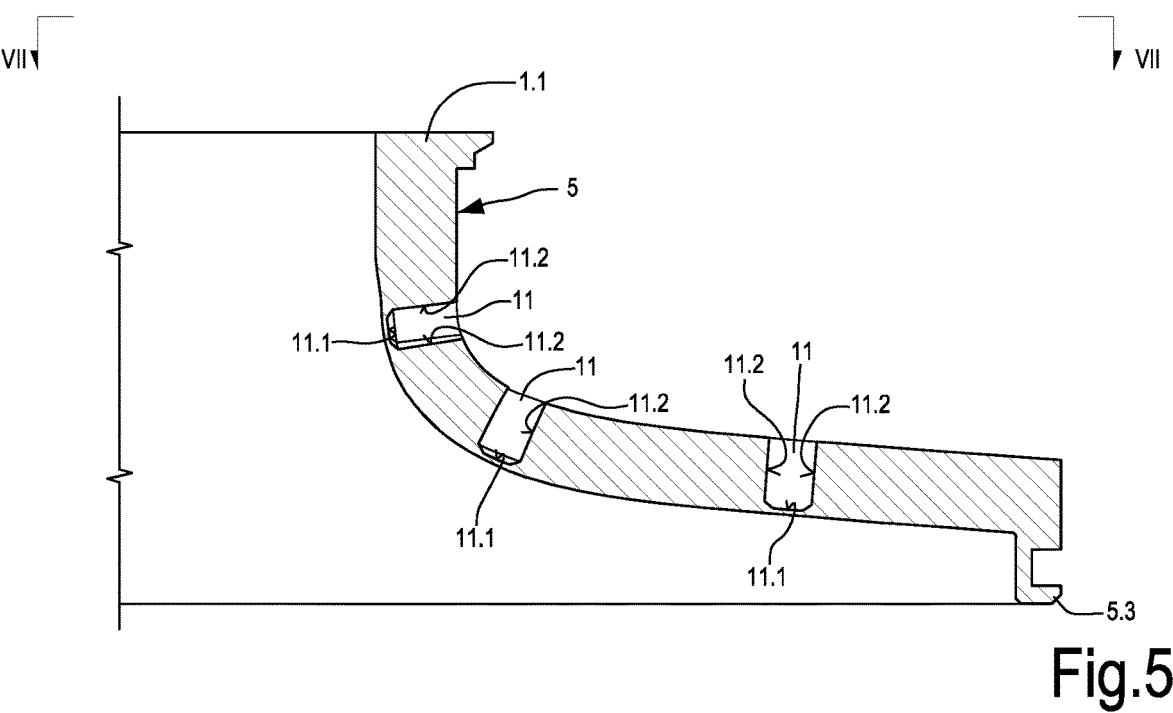
FIG. 5 illustrates a sectional view according to line V-V in FIG. 7 of a semi-finished shroud.

For a better understanding of the welding process, FIG. 5 illustrates a sectional view of a semi-finished shroud before welding to the disk of an impeller. The impeller is symmetrical with respect to the rotation axis A-A, and therefore only half impeller is shown in the sectional view of FIG. 5. In dotted lines the outline of the final impeller shape is shown. As can be understood from the overlapped dotted final outline of the impeller, the shroud is semi-finished, in that the thickness thereof is substantially larger than the thickness of the final impeller shroud, shown in dotted lines. Additionally, the semi-finished shroud 5 comprises a circumferential projection 5.3, which will be removed in a final machining step and which is used during the welding process to provisionally couple the semi-finished shroud to a semi-finished disk.

Figure 6:
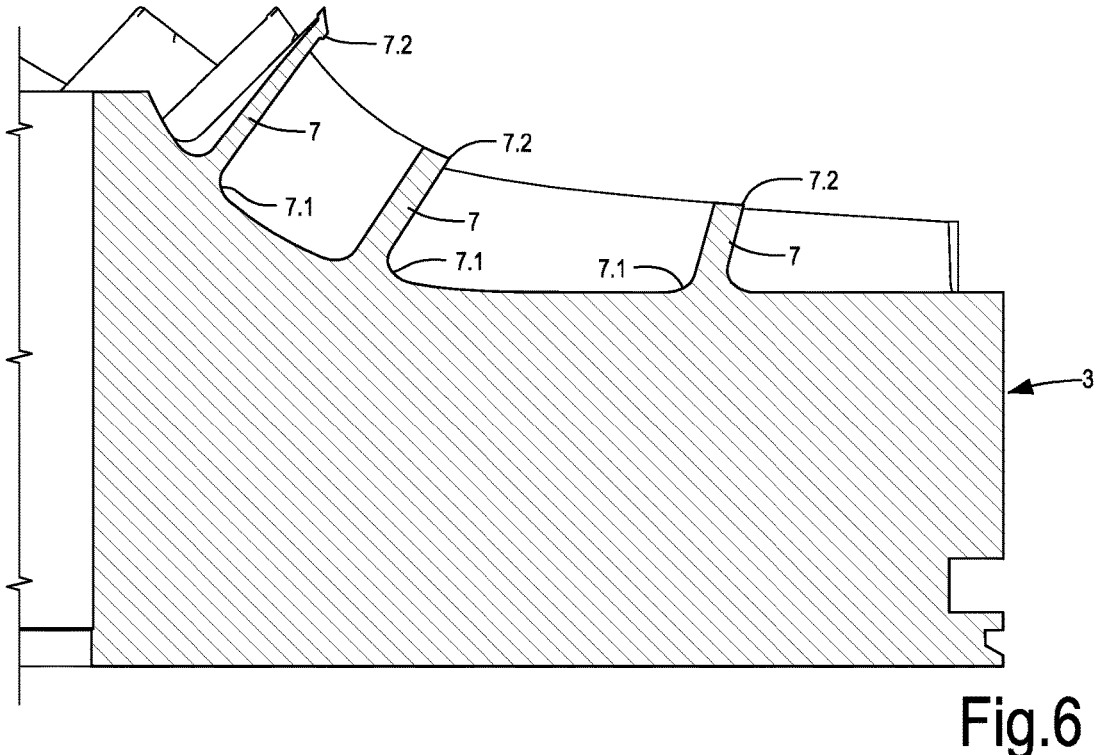
FIG. 6 illustrates a sectional view according to line VI-VI in FIG. 9 of a semi-finished disk and relevant blades.

The semi-finished disk 3 is shown in FIG. 6 in a partial sectional view along a radial plane containing the rotation axis of the impeller.

Figure 10:
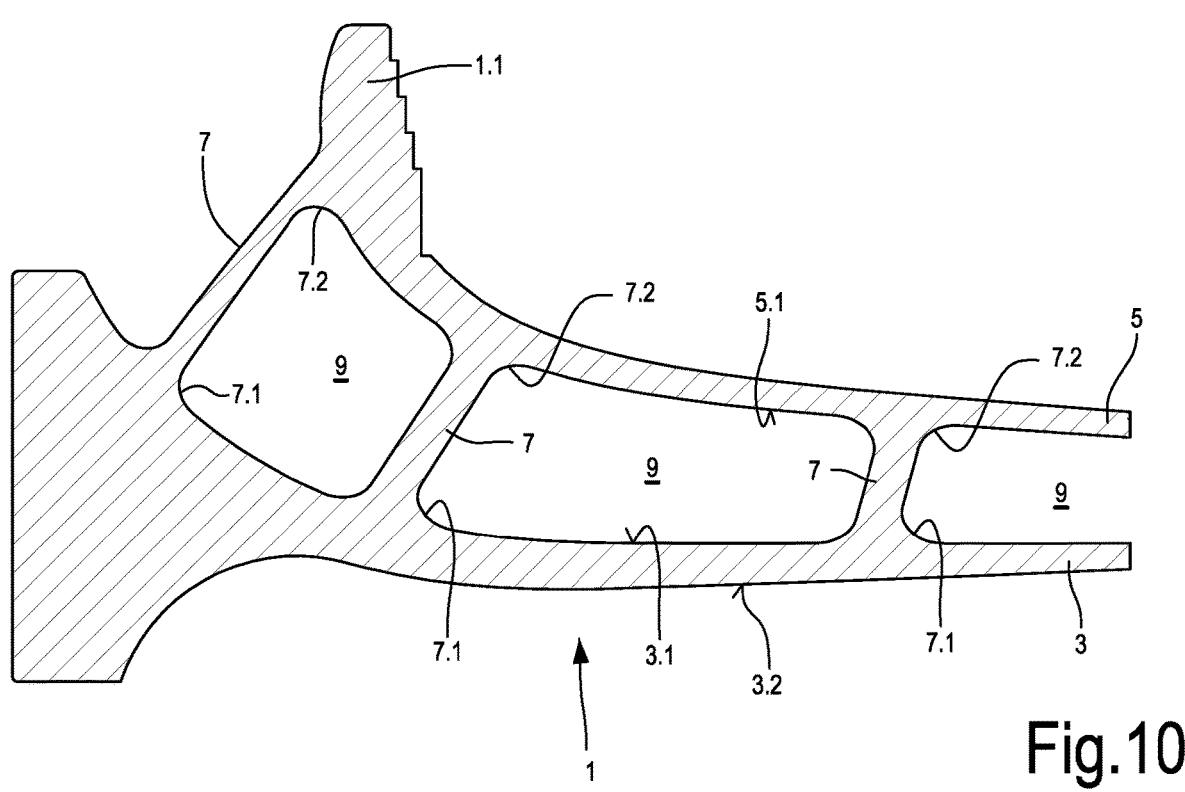
FIG. 10 illustrates a sectional view, according to a radial plane containing the rotation axis of a finished impeller.

The final impeller is shown in a partial sectional view along a radial plane in FIG. 10. Reference 1.1 indicates the impeller eye.

Figures 7, 8:
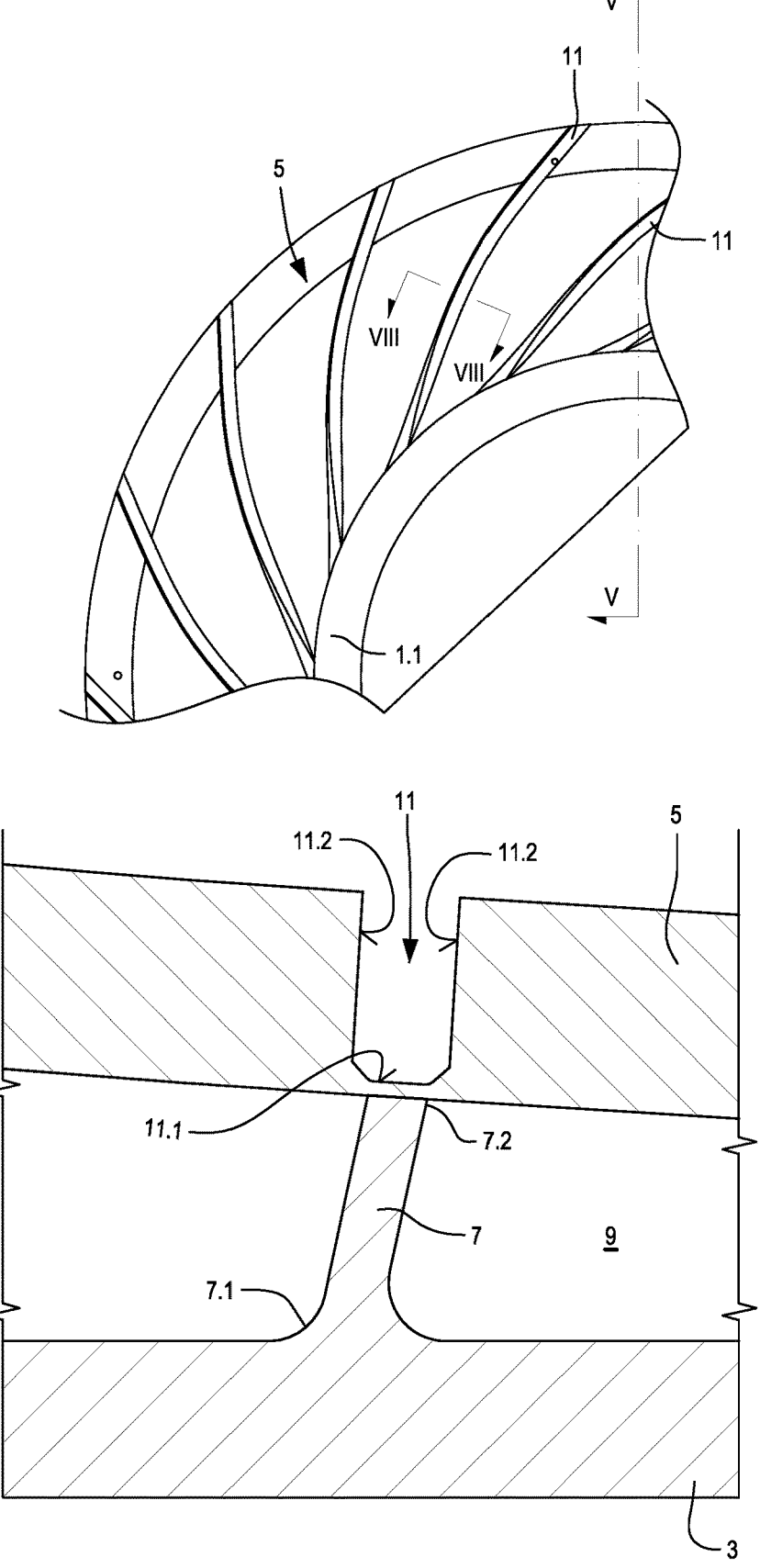
FIG. 7 illustrates a plan view according to line VII-VII in FIG. 5 of the semi-finished shroud.
FIG. 8 illustrates a sectional view along line VIII-VIII in FIG. 7.
Figure 9:
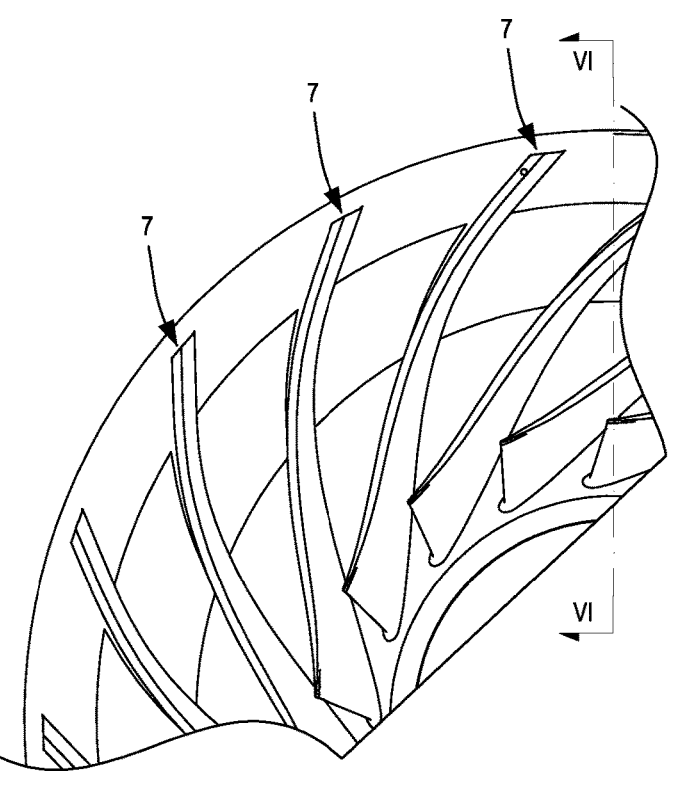
FIG. 9 illustrates a view according to line IX-IX in FIG. 6.

As best shown in FIGS. 7 and 9, the grooves 11 provided on the outer surface of the semi-finished shroud 5 extend have a longitudinal extension having a shape corresponding to the shape of the tip 7.2 of a respective blade 7, such that when the shroud 7 and the disk 5 are placed one on top of the other, the grooves 11 are coextensive with the blade tips 7.2, i.e., extend along the tips 7.2 of corresponding blades 7.

As shown in the sectional view of FIG. 8, each groove 11 has a bottom 11.1 and two side walls 11.2. When the shroud 5 is placed on top of the disk 3, the outer surface of the bottom 11.1 is in contact with the tip 7.2 of a corresponding blade 7 machined in the disk 3.

Before welding the blades 7 to the shroud 5, a preliminary welding step is performed to provisionally connect the semi-finished shroud to the semi-finished disk 3. The provisional welding is performed along a circumferential line, connecting the circular projection 5.3 (FIG. 5) of the semi-finished shroud 5 to a circular edge 3.5 of the semi-finished disk 3 (FIG. 6). The correct mutual angular position of the semi-finished shroud 5 and of the semi-finished disk 3 can be determined by means of dead holes in the tips 7.2 of some of the blades 7 formed monolithically with the semi-finished disk 3 and respective through holes in the bottom 11.1 of some of the grooves 11. Dowels be introduced into the through holes in the bottom 11.1 of the grooves and into the corresponding dead holes of the blades 7.

Once the semi-finished shroud 5 and the semi-finished disk 3 have been provisionally assembled and welded to one another along the circumferential projection 5.3, to form a semi-finished impeller 1, this latter is mounted on the tilting table 23, to perform welding along each blade 7.

The sequence of FIGS. 11A-11J the steps of the welding process to weld one of the blades 7 to the shroud 5. As noted above, the process is divided into two stages: a first stage which involves melting the groove bottom 11.1 and the blade tip 7.1, and subsequently solidifying the molten material; and a second stage of filling the groove 11 with added filling metal material, fed in powder or wire form. As noted above, the two stages are usually not performed in sequence on the same groove 11. Rather, welding of the groove bottoms is performed first for all the groove 11, and filling with the added metal material is performed afterwards.

In the sequence of FIGS. 11A-11J the groove 11 and the blade tip 7.2 are shown in a cross-sectional view according to line VIII-VIII of FIG. 7.

Once the semi-finished impeller 1 has been locked on the tilting table 23, in a first step, the laser head 25 brought at one end of the groove 11, such that a laser beam B will generate a laser spot located at one end of the groove 11, near one of the side walls 11.2 thereof. The laser head 25 is moved according to a wobbling movement, combined with a main motion along a trajectory which extends from one end to the opposite end of the groove 11. The main motion can be imparted to the laser head 25, to the impeller 1 or both, i.e., can be obtained by combining a motion of the tilting table 23 and a motion of the laser head 25 with respect to a stationary structure supporting the laser head 25 and the table 23.

Figure 11A:
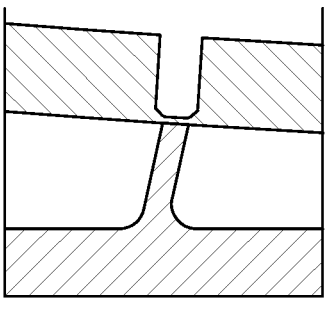
FIGS. 11A-11J schematically illustrate a sequence of welding one blade to the shroud of the semi-finished impeller.

In some embodiments, the motion can start at the radial outermost end of the groove 11. The combined linear motion along the main trajectory T (FIG. 4) and wobbling motion of the laser B melts the metal material, whereof the shroud 5 and the blade 7 are made. In FIG. 11A a step preceding melting is shown. More specifically, the bottom 11.1 of the groove 11 and the uppermost portion of the blade tip 7.2 are molten. The width W of the molten area (pool of molten metal) in the transversal direction of the groove 11 depends upon the diameter of the circular wobbling motion, and can be a multiple of the diameter of the laser spot S. The width of the melting pool, i.e., the pool of molten metal, is usually smaller than the width W of the groove 11.

Figure 11B:
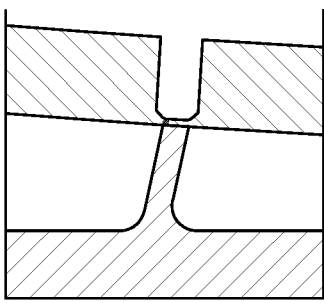

As the laser spot S moves along the linear trajectory T along the longitudinal extension of the grove 11, the molten metal behind the laser spot S gradually solidifies generating a welding bead, formed by molten and solidified material of the bottom 11.1 of the groove 11 and by molten and solidified material of the blade tip 7.2. The bead is shown in FIG. 11B.

Since, as noted above, the diameter (W in FIG. 4) of the melting pool is usually smaller than the width of the groove 11, the step described above can be repeated twice or more times, with two or more passes of the laser beam along the groove 11. Each pass is shifted laterally with respect to the previous one along the transverse direction of the groove 11. If the width of the groove 11 is equal to the diameter of the melting pool, then a single pass is sufficient.

Figure 11C:
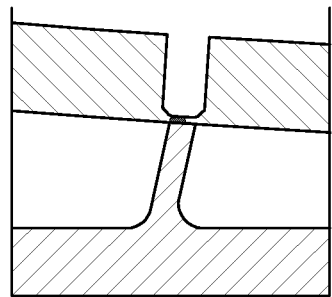
Figure 11D:
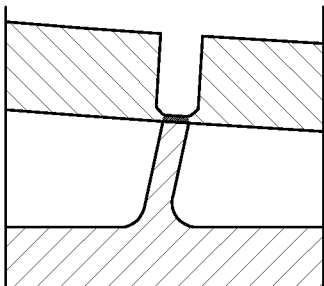

By moving the laser beam B along an additional trajectory which is offset from the first trajectory in the transversal direction of the groove 11, as shown for instance in FIG. 11C, a further melting pool is formed moved from one end to the opposite end of the groove 11 in the longitudinal direction thereof. The molten material subsequently solidifies. If needed the wobbling laser beam can be moved along a plurality of further trajectories along the groove 11, each trajectory being offset from the previous one in the transversal direction, i.e., in the direction of the width of the groove 11, until (FIG. 11D) the whole bottom of the groove 11 and the whole tip 7.2 of the respective blade 7 have been molten and subsequently solidified. A welding bead as large as the groove 11 is thus formed. The groove 11 has a width substantially corresponding to the width of the blade 7, or preferably larger than the width of the blade 7, such that the resulting welding layer has a width equal to or larger than the thickness of the blade 7.

Thanks to the use of a wobbling laser, i.e., a laser beam B having a wobbling motion combined with the main motion along the longitudinal welding trajectories T, the number of laser passes required to generate a welding layer as large as the width of the groove is substantially smaller than the ratio between the width of the groove 11 and the laser spot diameter. The time required to generate the welding layer is small and the welding method can be used also in case of impellers of large dimensions, where the thickness of the blades 7 is comparatively large.

A further stage of welding and filling of the groove 11 with metallic material is now performed (FIGS. 11E-11J).

As noted above, the further stage can be performed after welding and solidification of the groove bottom 11.1, or after the bottom 11.1 of one, some or all the other grooves 11 have been molten and welded to the tips 7.2 of the corresponding blades 2. This second approach is preferred, since the risk of thermal deformations of the semi-finished impeller 1 is reduced.

The second stage of welding involves the addition of metallic material in the groove 11, in order to fill the groove. The metallic material can be dispensed in form of a wire or in powder form, for instance. The added metallic material is placed under the wobbling laser beam B while this latter is moved according to a trajectory T along the respective groove 11, the linear motion along the main trajectory T being combined with the wobbling motion of the laser beam B to generate a molten pool having a width larger than the diameter of the laser spot S.

In FIG. 3 a nozzle 31 for dispensing a metallic power towards the melting pool formed along the bottom of the groove 11 during this welding stage is schematically shown as an exemplary embodiment of metal dispensing device. As mentioned, the metallic material can be delivered also in other forms, for instance in the form of a wire.

Figure 11E:
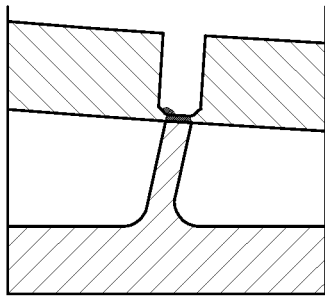
Figure 11F:
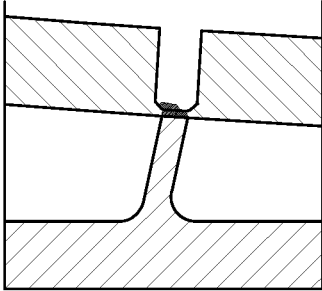
Figure 11G:
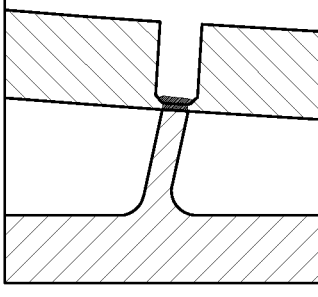
Figure 11H:
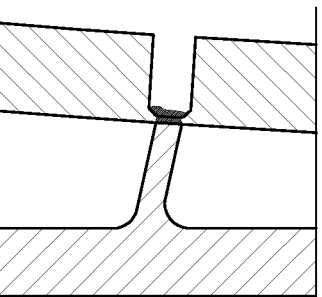
Figure 11I:
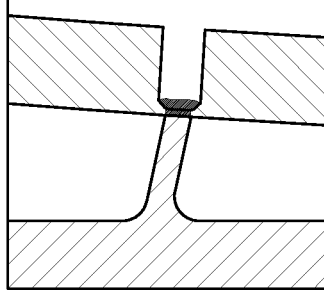
Figure 11J:
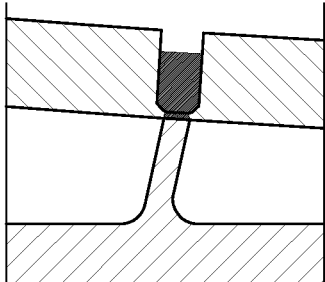

In FIG. 11E a first bead formed by melting and solidifying added metallic material along a side of the groove 11 is shown. The step is repeated two or more times, as shown in the sequence of FIGS. 1F, 11G, until a layer of molten and subsequently solidified added metallic material is formed. The number of laser passes needed to complete a layer depends on the diameter of the laser spot S, on the width of the wobbling movement (e.g., the diameter of a circular wobbling motion) and on the width of the groove 11. If the width of the groove 11 is very small, and equal to the diameter of the pool of molten metal material formed by the wobbling laser, a single pass is sufficient to generate a layer of molten and subsequently solidified metal material.

The process is repeated (see FIGS. 11H-11J) as many times as require to form a filling which is sufficient for the subsequent machining of the impeller 11. In some instances, the whole groove 11 can be filled until the outer surface 5.2 of the semi-finished shroud is reached with the last layer of molten and solidified added metallic material.

The multi-pass process in combination with wobbling motion of the laser beam B results in quick filling the whole groove 11, or a part thereof as required, even in case of large impellers 1, wherein the thickness of the blade tips 7.2, and therefore the width of the grooves 11, require several passes with the laser beam along laterally offset main trajectories T. In some cases, the diameter of the wobbling motion can be adapted to the transverse dimension of the groove, such that a larger melting pool is generated at each laser pass, using a wider wobbling motion, in case of larger blades 7.

The procedure described above results in an efficient welding process of impellers of even large dimensions, avoiding the use of arc welding and thus reducing the resulting thermally induced stresses and deformations of the impeller.

As mentioned, in preferred embodiments a semi-finished shroud 5 and a semi-finished disk are welded together as described above, such that the thermally induced impeller deformations are reduced, thanks to the thickness of the semi-finished shroud 5 and disk 3. The excess material is then removed by machining, e.g., by milling, until the final impeller shown in the sectional view of FIG. 10 is obtained. The chip removal process also removes the circumferential excess material of the impeller, thus removing the provisional welding bead formed along the circular projection 5.3 of the shroud 5.

While in the above description and attached drawings the blades 7 are formed by machining the disk 3 and the grooves 11 are machined in the outer surface 5.2 of the shroud, as mentioned above, an opposite approach can be used, wherein the blades 7 are machined as a monolithic portion of the shroud 5, starting from a blank, such that the blades 7 will project from the inner surface 5.1 of the shroud, while the disk 3 is provided with a smooth inner surface 3.1 and with grooves 11 machined in the outer surface 3.2 thereof.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A method for manufacturing a shrouded impeller, the method comprising:
   providing a disk and a shroud, the disk comprising blades having a base and a tip and the shroud having an outer surface with grooves disposed therein, the grooves having side surfaces and a bottom;
   placing the disk and the shroud coaxial to one another so that the blades align with and contact the shroud proximate the grooves;
   using a wobbling laser beam with a wobbling movement, welding each of the blades to the shroud along the grooves, by:
      first, passing the wobbling laser beam along each groove a number of passes to melt the bottom of the grooves and form a weld that is as wide as the grooves, wherein the wobbling movement is configured to limit the number of passes to less than a ratio between width of the grooves and diameter of the wobbling laser beam; and
      second, after subsequent solidification of molten material at the bottom welds the disk and the shroud along each of the grooves, generating superimposed layers of metal material to fill each of the grooves, wherein each layer of metal material is molten with the wobbling laser beam and subsequently solidifies inside of the grooves.

2. The method of claim 1, wherein the wobbling movement includes a first trajectory for the wobbling laser beam that extends along the groove and causes local welding of the disk and the shroud along the first trajectory.

3. The method of claim 1, wherein the metal filling material is delivered in the grooves in powder form.

4. The method of claim 1, wherein the metal filling material is a bar or wire prior to melting by the wobbling laser beam.

5. The method of claim 1, further comprising: milling either the disk or the shroud.

6. The method of claim 1, further comprising: milling the grooves.

7. The method of claim 1, further comprising: machining the shroud and the disk to a final shape for the shrouded impeller.

8. The method of claim 1, wherein the wobbling movement includes a pair of trajectories for the wobbling laser beam that are parallel to and laterally offset from one another along the width of the groove.

9. The method of claim 1, wherein the wobbling movement includes a plurality of trajectories for the wobbling laser beam until the whole bottom of the groove is welded to the respective blade.

10. The method of claim 1, wherein the wobbling movement includes a first filling trajectory for the wobbling laser beam that extends along the groove concomitantly with delivery of the metal filling material into the groove.

11. The method of claim 1, wherein the wobbling movement includes a pair of filling trajectories that are parallel to and laterally offset from one another along the width of the groove.

12. The method of claim 1, wherein the layers of metal filling material fill the groove to the outer surface of the shroud.

13. A method for manufacturing a shrouded impeller, the method comprising:
   providing a disk and a shroud, the disk comprising an outer surface with grooves disposed therein, the grooves having side surfaces and a bottom, and the shroud comprising blades having a base and a tip;
   placing the disk and the shroud coaxial to one another so that the blades align with and contact the shroud proximate the grooves;
   using a wobbling laser beam with a wobbling movement, welding each of the blades to the shroud along the grooves, by:
      first, passing the wobbling laser beam along each groove a number of passes to melt the bottom of the grooves and form a weld that is as wide as the grooves, wherein the wobbling movement is configured to limit the number of passes to less than a ratio between width of the grooves and diameter of the wobbling laser beam; and
      second, after subsequent solidification of molten material at the bottom welds the disk and the shroud along each of the grooves, generating superimposed layers of metal material to fill each of the grooves, wherein each layer of metal material is molten with the wobbling laser beam and subsequently solidifies inside of the grooves.

14. The method of claim 13, wherein the wobbling movement includes a pair of trajectories for the wobbling laser beam that are parallel to and laterally offset from one another along the width of the groove.

15. The method of claim 13, wherein the wobbling movement includes a plurality of trajectories for the wobbling laser beam until the whole bottom of the groove is welded to the respective blade.

16. The method of claim 13, wherein the wobbling movement includes a first filling trajectory for the wobbling laser beam that extends along the groove concomitantly with delivery of the metal filling material into the groove.

17. The method of claim 13, wherein the wobbling movement includes a pair of filling trajectories that are parallel to and laterally offset from one another along the width of the groove.

18. The method of claim 13, wherein the layers of metal filling material fill the groove to the outer surface of the disk.

* * * * *